United States Patent [19]

Seneker

[11] Patent Number: 5,208,315

[45] Date of Patent: May 4, 1993

[54] ELASTOMERS BASED ON 4,4'-DIISOCYANATO DICYCLOHEXYLMETHANE ENRICHED IN THE TRANS, TRANS ISOMER WHICH CONTAIN ESSENTIALLY NO CHAIN EXTENDERS

[75] Inventor: Stephen D. Seneker, Paden City, W. Va.

[73] Assignee: Miles Inc., Pittsburgh, Pa.

[21] Appl. No.: 772,995

[22] Filed: Oct. 8, 1991

[51] Int. Cl.$^5$ .............................................. C08G 18/75
[52] U.S. Cl. .................................... 528/67; 528/59; 528/68; 528/76; 528/77; 528/80; 528/83; 528/85
[58] Field of Search ................. 528/59, 67, 68, 76, 528/80, 85, 77, 83

[56] References Cited

U.S. PATENT DOCUMENTS

| | | | |
|---|---|---|---|
| 3,620,905 | 11/1971 | Ahramjian | 161/190 |
| 3,684,769 | 8/1972 | Abbott et al. | 528/55 |
| 3,789,032 | 1/1974 | Hoeschele | 528/63 |
| 3,857,819 | 12/1974 | Mathis | 528/57 |
| 3,997,514 | 12/1976 | Kogon | 528/64 |
| 4,337,130 | 6/1982 | Ahramjian | 524/539 |
| 4,764,543 | 8/1988 | Savina | 521/160 |
| 4,983,763 | 1/1991 | Seneker et al. | 560/352 |
| 5,086,150 | 2/1992 | Frauendorf et al. | 528/45 |

FOREIGN PATENT DOCUMENTS 971184 7/1975 Canada .

OTHER PUBLICATIONS

S. W. Wong, K. C. Krisch, C. A. Byrne, D. P. Mack and N. S. Schneider, Adv Urethane, Sci. Technol., 9, 77 (1984).

Primary Examiner—John Kight, III
Assistant Examiner—Rabon Sergent
Attorney, Agent, or Firm—Joseph C. Gil; Godfried R. Akorli

[57] ABSTRACT

Disclosed herein is an improved elastomer comprising a reaction product of a polyisocyanate and an active hydrogen containing material, the improvement wherein the elastomer is essentially free of a chain extender, wherein the polyisocyanate comprises 4,4'-diisocyanato dicyclohexylmethane containing from about 45 to 100 percent of the trans,trans isomer.

5 Claims, No Drawings

ELASTOMERS BASED ON 4,4'-DIISOCYANATO DICYCLOHEXYLMETHANE ENRICHED IN THE TRANS, TRANS ISOMER WHICH CONTAIN ESSENTIALLY NO CHAIN EXTENDERS

BACKGROUND OF THE INVENTION

The present invention relates to polyurethane elastomens based on 4,4'-diisocyanato dicyclohexylmethane (alternately referred to as "PICM"). More specifically the present invention relates to polyurethane elastomers based on 4,4'-diisocyanato dicyclohexylmethane which are substantially free of chain-extending agents.

BRIEF DESCRIPTION OF THE PRIOR ART

The use of 4,4'-diisocyanato dicyclohexylmethane in preparation of polyurethane elastomers is generally known in the art. The preparation of the polyurethane elastomers is carried out in accordance with conventional procedures which generally entail the formation of prepolymers by the reaction of an excess of PICM with a polyether or a polyester glycol or polyol followed by chain extension and/or crosslinking with a glycol, polyol, diamine, polyamine or water, added in an amount which is about equivalent to the excess of isocyanato groups remaining after the prepolymer formation. Alternately, there can be employed a "one-shot" technique, in which the afore-described ingredients are all mixed and allowed to react simultaneously, usually in the presence of a catalyst.

Unlike the present invention, the art-known preparation of elastomers generally involves the use of a significant amount of chain extenders. Canadian Patent 971,184 discloses an aliphatic isocyanate composition which contains a high percentage of the trans,trans isomer of 4,4'-methylene bis(cyclohexylisocyanate) (also referred to as "PICM") and from 0.5 to 3 moles of low molecular weight diol per mole of polyol.

S. W. Wong, K. C. Frisch, C. A. Byrne, D. P. Mack and N. S. Schneider, Adv Urethane, Sci. Technol., 9, 77(1984) discloses thermoplastic polyurethane systems which consist of PICM and 2000 molecular weight polytetramethylene glycol with and without a diol chain extender. The polyurethane systems employing PICM with a trans,trans isomer content of 20% without a chain extender lacked the desirable elastomeric properties. The useful polyurethane systems employing PICM with trans,trans contents ranging from 10 to 95%, also employ chain extenders in a mole ratio of chain extender to polyol of about 1.5:1.

U.S. Pat. No. 3,620,905 discloses thermoplastic polyurethanes prepared from PICM containing 10–100 percent trans,trans isomer, a polyester or polyether glycol having a molecular weight of 500–3000 and a diol having a molecular weight below 250. The minimum mole ratio of chain extender to polyol claimed herein is about 0.3:1. Seemingly, the minimum mole ratio reduced to practice is 1.0:1.0.

U S. Pat. No. 3,789,032 discloses polyurethane/polyurea compositions prepared by the process of reacting PICM containing at least 60% of the trans,trans isomer with a polyol and an aromatic diamine chain extender in proportions such that there is an excess of isocyanato groups over hydroxyl and amino groups, wherein sufficient water is provided to react with the excess isocyanato groups. The minimum ratio of chain extender to polyol claimed is about 0.4:1. Seemingly, the minimum mole ratio reduced to practice is 1.0:1.0.

In all, the prior art neither teaches nor suggests the preparation of useful poly(urethane-ureas) without the use so of chain extenders. By the present invention there is provided a polyurethane/polyurea which is particularly useful as an elastomer which is substantially free of a chain extender.

SUMMARY OF THE INVENTION

In accordance with the foregoing, the claimed invention encompasses an improved elastomer comprising a reaction product of a polyisocyanate and an active hydrogen containing material, the improvement wherein the elastomer is essentially free of a chain extender, and the polyisocyanate comprises 4,4'-diisocyanato dicyclohexylmethane containing from about 45 to 100 percent of the trans,trans isomer.

In a preferred embodiment of the invention, the present invention encompasses a poly(urethane-urea) elastomer comprising (A) 1.0 mole of a high molecular weight, active hydrogen containing material having a molecular weight of about 600 to 5000 and an average functionality of 2 to 6;

(B) 0.0 to about 0.30 moles of a low molecular weight, active hydrogen containing material having a molecular weight of about 18 to 400 and a functionality of 2 to 3, and (C) a polyisocyanate containing from 45 to 100 percent by weight of the trans,trans-4,4'-diisocyanato dicyclohexylmethane isomer, in an amount substantially equivalent to the moles of (A) and (B), (D) optionally a urethane forming catalyst.

In a particularly preferred embodiment of the invention the poly(urethane-urea) consists essentially of:

(A) 1.0 mole of an active hydrogen containing material with terminal primary and/or secondary amino and/or hydroxyl groups having a molecular weight of about 600–5000 and a functionality of 2 to 6, (B) a polyisocyanate containing from 45 to 100 weight percent of the trans,trans-4,4'-diisocyanato dicyclohexylmethane isomer, in an amount substantially equivalent to the mole of (A); and (C) optionally, a urethane forming catalyst.

The elastomers of the claimed invention have been found to retain their shape at ambient temperatures and exhibit excellent physical and mechanical properties. This and other aspects of the invention are described more fully hereunder.

DETAILED DESCRIPTION OF THE INVENTION

The poly(urethane-urea) of the claimed invention is based on 4,4'-diisocyanato dicyclohexylmethane containing a high amount of the trans,trans isomer and is characterized as being free of, or substantially free of chain extenders. The amount of the trans,trans isomer of the 4,4'-diisocyanato dicyclohexylmethane can be from about 45 to 100 percent and preferably from 70 to 100 percent. In the preparation of the poly(urethane-urea) of the claimed invention, the 4,4'-diisocyanato dicyclohexylmethane can be reacted with a soft segment type of an active hydrogen containing material having a functionality of about 2 and preferably from 2 to 6, and molecular weight of about 600 to 5000.

Substantially any mixture of the 4,4'-diisocyanato dicyclohexylmethane containing at least 45 percent by weight of the trans,trans isomer can be employed herein. It is generally preferable to employ mixtures which typically contain about 50 percent by weight of the trans,trans isomer. The 4,4'-diisocyanato dicyclohexylmethane containing higher amounts of the trans,trans isomer can be prepared by art-known techniques. For example, if bis-(4-aminophenyl)-methane is hydrogenated to the corresponding dicyclohexyl compound, the mixture can contain up to about 50% by weight of the trans,trans isomer. The hydrogenated amine mixture can be subjected to a crystallization process to obtain an amine mixture having a higher trans,trans isomer content, i.e., up to about 80% by weight. Suitable processes are disclosed in U.S. Pat. Nos. 2,494,563, 3,153,088, 3,384,661 and 3,393,236. Subsequent blending of amine mixtures having different trans,trans isomer contents can be used to produce other trans,trans isomer contents. Phosgenation of the amine mixtures will produce the corresponding mixture of diisocyanates containing the same trans,trans isomer as the amine mixture.

In addition, methods exist for separating the trans,trans isomer from the remaining isomers in the diisocyanate mixture. For example, a solvent crystallization process is disclosed in U.S. Pat. No. 4,983,763 and a melt crystallization process is disclosed in copending application, U.S. Ser. No. 07/513,698, filed Apr. 24, 1990, the disclosures of which are herein incorporated by reference. By using diisocyanate mixtures containing varying amounts of the trans,trans isomer, e.g., 20%, 50% and virtually 100% by weight, it is possible to prepare mixtures of bis-(4-isocyanatocyclohexyl)-methane (also referred to as "PICM") having any desired trans,trans isomer content for use in accordance with the present invention.

As the active hydrogen containing material, there can be employed the soft segment types having a functionality of about 2 or higher and typically from 2 to 6. The soft segment type, active hydrogen containing materials are of relatively high molecular weight. Molecular weight of the useful active hydrogen containing material can, generally, be from about 600 to 5000 and preferably from about 800 to 3000 and more preferably from about 1000 to 2000. The molecular weights are number average molecular weights ($M_n$) and are determined by end group analysis (OH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols, polyhydroxy polycarbonates, polyhydroxy polyethercarbonate and polyhydroxypolyestercarbonates are preferred.

Suitable polyester polyols include reaction products of polyhydric, preferably dihydric alcohols to which trihydric alcohols may be added, and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids; dimethyl terephthalates and bis-glycol terephthalate. Suitable polyhydric alcohols include, e.g. ethylene glycol, propylene glycol-(1,2) and; -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g. $\epsilon$-caprolactone or hydroxycarboxylic acids, e.g. $\omega$-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Suitable amine starting compounds include ammonia, methyl amine, ethanolamine, diethanolamine, triethanolamine, ethylene diamine, diethylene triamine, triethylene tetramine, tetramethylene diamine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 2-propane diamine, hydrazine, aminoacid hydrazides, hydrazides of semicarbazido carboxylic acids, bishydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

The preferred starting compounds for the polyethers are those compounds which exclusively contain hydroxyl groups. Polyethers containing tertiary amine groups are less preferred and compounds containing isocyanate-reactive-NH groups are much less preferred.

Among the polythioethers which should be particularly mentioned are the condensation products obtained from thiodiglycol on its own or in combination with other glycols and dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides or polyamino amides polyamines include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate and glycidyl methacrylate. Polyhydroxy polyacrylates can be used but are less preferred due to their higher functionality.

Suitable amine terminated polyols can be polyoxyalkylene polyamines, amine terminated polyether such as obtained from the reaction of polyfunctional acetoacetic acid esters and polyamines, and the like.

In the preparation of the poly(urethane-urea), about 1.0 mole of a high molecular weight, active hydrogen containing material having a molecular weight of about 600 to 5000 and a functionality of 2 to 6, and about 0.0 to about 0.30 moles of a low molecular weight, active hydrogen containing material having a molecular weight of about 18 to 400 and a functionality of 2 to 3 are reacted with a polyisocyanate containing from 45 to 100 percent by weight of the trans,trans-4,4'-diisocyanato dicyclohexylmethane isomer, in an amount substantially equivalent to the moles of (A) and (B).

The reaction temperature is normally maintained below about 150° C., preferably between about 50° and 130° C. The reaction is continued until isocyanate content decreases to the theoretical amount or slightly below.

The reaction can be conducted in the presence of catalysts known to accelerate the reaction between isocyanate groups and isocyanate-reactive groups, such as organo-tin compounds, tertiary amines, etc.. However, the use of a catalyst is generally not necessary and it is often preferred to conduct the reaction without a catalyst.

The reaction can be conducted in the presence of solvent provided that the solvent is substantially nonreactive in the context of the isocyanate-polyaddition reaction. The solvents are generally organic and may comprise essentially of carbon and hydrogen with or without other elements such as oxygen or nitrogen. While it may not be necessary to employ a solvent during the reaction, the use of a solvent may be desirable to maintain the reactants in the liquid state as well as to permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In accordance with the claimed invention, the poly(urethane-urea) is free of, or substantially free of chain extenders. It was surprising to find that without chain extenders, the poly(urethane-ureas) of the claimed invention exhibit good physical properties which is typically attributed to the presence of the "hard segment" derived from chain extenders. Hence the active hydrogen containing material can be said to consist essentially of the soft segment types described hereinabove. The term consist essentially of as used herein denotes that while the poly(urethane-urea) of the invention does not require the chain extenders, low levels of the chain extenders can nonetheless be employed. The useful chain extender can be a low molecular weight active hydrogen containing materials having an average functionality of 2 or higher and preferably from 2 to 3. The low molecular weight compounds which may be used in combination with the high molecular weight active hydrogen containing materials include the polyhydric alcohols, which have previously been described for the preparation of the polyester polyols and polyether polyols and the polyamines, which have been previously been described for the preparation of amine started polyethers. Dihydric alcohols are preferred. Molecular weight of the chain extender can be from 18 to 400 and preferably from about 60 to 250. Specific but non-limiting examples of the chain extenders can be ethylene glycol, 1,4-butanediol, 1,6-hexanediol bis(hydroxyethylether) of 1,4-hydroquinone, trimethylolpropane, and bis(4-amino-3-chlorophenyl) methane.

Auxiliary agents can be employed in combination with polyurethane/polyurea of the claimed invention. Examples of the auxiliary agents can be fillers, extenders, flow aids, stabilizers and adhesion promoters.

As would be realized from the foregoing, in employing lesser amount of an active hydrogen containing material in the preparation of the claimed polyurethane/polyurea, one in effect employs a lesser amount of the polyisocyanate which reacts therewith. Nonetheless, the resultant poly(urethane-urea) of the claimed invention exhibit sufficient rigidity, e.g., the required hardness and flexibility and other essential properties that are typical of elastomers. Typically, the hardness of the poly(urethane-urea) can be from about 10 Shore A to 80 Shore D and preferably from 10 Shore A to 80 Shore A; the flexibility, as determined from a measurement of the elongation at break, can range from about 10 to greater than 1000 percent and preferably from 100 to 900 percent. In the practice of the invention the poly(urethane-urea) can be used in making products such as seals and gaskets, laminates for safety glass, and products for biomedical applications such as blood bags.

This and other aspects of the claimed invention are further illustrated by the following non-limiting examples.

EXAMPLES

Example 1

Bis-(4-isocyanatocyclohexyl)methane containing 99 percent by weight of the trans,trans isomer (126.28 grams, 0.963 equivalents) was charged as a crystalline solid to a 1-liter, 3-neck flask equipped with a thermocouple, condenser with drying tube, and a mechanical stirrer. After melting the solid diisocyanate at 85° C., 2000 MW polytetramethylene glycol (319.22 grams, 0.316 equivalents) was charged. The solution was mixed until homogeneous and then 4.50 grams of a one weight percent solution of dibutyltin dilaurate catalyst in 2000 MW polytetramethylene glycol (0.004 OH equivalents) was added. The reaction temperature was adjusted to 80° C. and held at that temperature for about two hours. At this point the reaction was complete, as the isocyanate content was 5.47% (theoretical % NCO=5.99). The prepolymer was then vacuum degassed for 30 minutes at 0.15 mm Hg.

To 116.00 grams (0.151 equivalents) of the above 5.47% NCO isocyanate-terminated prepolymer at 80° C. were added 145.22 grams (0.144 equivalents) of 2000 MW polytetramethylene glycol at 80° C. which was also vacuum degassed for 30 minutes at 0.15 mm Hg and 2.80 grams of one weight percent dibutyltin dilaurate catalyst in 2000 MW polytetramethylene glycol (0.003 OH equivalents). The formulation has an isocyante to hydroxyl ratio of 1.03. The mixture was stirred thoroughly until homogeneous and then poured quickly into a 8"×8"×⅛" closed mold preheated at 80° C. The mold was transferred to a vented oven at 110° C. and cured at that temperature for about 16 hours and then removed from the mold. The sample was conditioned at room temperature and 50% relative humidity for two weeks prior to testing. The sample retained its shape when stored at room temperature (23° C.).

Comparative Example 1 (CE 1)

Bis-(4-isocyanatocyclohexyl)methane containing 20 weight percent of the trans,trans isomer (168.37 grams, 1.283 equivalents) and 2000 MW polytetramethylene glycol (422.63 grams, 0.419 equivalents) were charged as liquids to a 1-liter, 3-neck flask equipped with a thermocouple, condenser with drying tube, and a mechanical stirrer. The solution was mixed until homogeneous and then 9.0 grams of a one weight percent solution of dibutyltin dilaurate catalyst in 2000 MW polytetramethylene glycol (0.009 OH equivalents) was added. The reaction temperature was adjusted to 80° C. and held at that temperature for about two hours. At this point the reaction was complete, as the isocyanate content was 5.87% (theoretical % NCO=5.99). The prepolymer was then vacuum degassed for 30 minutes at 0.15 mm Hg.

To 100.00 grams (0.140 equivalents) of the above 5.87% NCO isocyanate-terminated prepolymer at 80° C. were added 134.88 grams (0.134 equivalents) of 2000 MW polytetramethylene glycol at 80° C. which was also vacuum degassed for 30 minutes at 0.15 mm Hg and 2.05 grams of one weight percent dibutyltin dilaurate catalyst in 2000 MW polytetramethylene glycol (0.002 OH equivalents). The formulation has an isocyanate to hydroxyl ratio of 1.03. The mixture was stirred thoroughly until homogeneous and then poured quickly into a 8"×8"×⅛" closed mold preheated at 80° C. The mold was transferred to a vented oven at 110° C. and cured at that temperature for 16 hours. The resultant polyurethane Was cooled to room temperature and removed from the mold. The sample was condition at room temperature and 50% relative humidity for two weeks prior to testing. The sample deformed when stored at room temperature (23° C.).

Comparative Example 2 (CE 2)

Bis-(4-isocyanatocyclohexyl)methane containing 20 weight percent of the trans,trans isomer (310.68 grams, 2.368 equivalents) was charged to a 2-liter, 3-neck flask equipped with a thermocouple, condenser with drying tube, and a mechanical stirrer. Then 2000 MW polytetramethylene glycol (772.82 grams, 0.773 equivalents) was charged. The solution was mixed until homogeneous and then 16.50 grams of a one weight percent solution of dibutyltin dilaurate catalyst in 2000 MW polytetramethylene glycol (0.016 OH equivalents) was added. The reaction temperature was adjusted to 80° C. and held at that temperature for about two hours. At this point the reaction was complete, as the isocyanate content was 5.75% (theoretical % NCO=6.03). The prepolymer was then vacuum degassed for 30 minutes at 0.15 mm Hg.

To 115.00 grams (0.157 equivalents) of the above 5.75% NCO isocyanate-terminated prepolymer at 80° C. were added 110.28 grams (0.110 equivalents) of 2000 MW polytetramethylene glycol at 80.C which was also degassed for 30 minutes at 0.15 mm Hg, 1.84 grams (0.041 equivalents) of 1,4-butanediol, and 1.71 grams of one weight percent dibutyltin dilaurate catalyst in 2000 polytetramethylene glcyol (0.002 OH equivalents). The formulation has ban isocyanate to hydroxyl ration of 1.03. The mixture was stirred thoroughly until homogeneous and then poured quickly into a 8"×8"×⅛" closed mold preheated at 80° C. The mold was transferred to a vented oven at 110° C. and cured at that temperature for 16 hours. The resultant polyurethane was cooled to room temperature and removed from the mold. The sample was conditioned at room temperature and 50% relative humidity for two weeks prior to testing. The sample did not retain its shape when stored at room temperature (23° C.).

Example 2A

Bis-(4-isocyanatocyclohexyl)methane containing 50 weight percent of the trans,trans isomer (310.68 grams, 2.368 equivalents) was melted at 60° C. and then charged to a 2-liter, 3-neck flask equipped with a thermocouple, condenser with drying tube, and a mechanical stirrer. Then 2000 MW polytetramethylene glycol (772.82 grams, 0.773 equivalents) was charged. The solution was mixed until homogeneous and then 16.50 grams of a one weight percent solution of dibutyltin dilaurate catalyst in 2000 MW polytetramethylene glycol (0.016 OH equivalents) was added. The reaction temperature was adjusted to 80° C. and held at that temperature for about two hours. At this point the reaction was complete, as the isocyanate content was 5.75% (theoretical % NCO=6.03). The prepolymer was then vacuum degassed for 30 minutes at 0.15 mm Hg.

To 115.00 grams (0.157 equivalents) of the above 5.75% NCO isocyanate-terminated prepolymer at 80° C. were added 110.28 grams (0.110 equivalents) of 2000 MW polytetramethylene glycol at 80° C. which was also degassed for 30 minutes at 0.15 mm Hg, 1.84 grams (0.041 equivalents) of 1,4-butanediol, and 1.71 grams of one weight percent dibutyltin dilaurate catalyst s in 2000 MW polytetramethylene glycol (0.002 OH equivalents). The isocyanate to hydroxyl ration was 1.03. The mixture was stirred thoroughly until homogeneous and then poured quickly into a 8"×8"×⅛" closed mold preheated at 80° C. The mold was transferred to a vented oven at 110° C. and cured at that temperature for 16 hours. The resultant polyurethane was cooled to room temperature and removed from the mold. The sample was conditioned at room temperature and 50% relative humidity for two weeks prior to testing. The sample retained its shape when stored at room temperature (23° C.).

Example 2B

Bis-(4-isocyanatocyclohexyl)methane 80 weight percent of the trans,trans isomer (310.68 grams, 2.368 equivalents) was melted at 85° C. and then charged to a 2-liter, 3-neck flask equipped with a thermocouple, condenser with drying tube, and a mechanical stirrer. Then 2000 MW polytetramethylene glycol (772.82 grams, 0.773 equivalents) was charged. The solution was mixed until homogeneous and then 16.50 grams of a one weight percent solution of dibutyltin dilaurate catalyst in 2000 MW polytetramethylene glycol (0.016 OH equivalents) was added. The reaction temperature was adjusted to 80° C. and held at that temperature for about two hours. At this point the reaction was complete, as the isocyanate content was 5.65% (theoretical % NCO=6.03). The prepolymer was then vacuum degassed for 30 minutes at 0.15 mm Hg.

To 115.00 grams (0.155 equivalents) of the above 5.65% NCO isocyanate-terminated prepolymer at 80° C. were added 109.73 grams (0.110 equivalents) of 2000 MW polytetramethylene glycol at 80° C. which was also degassed for 30 minutes at 0.15 mm Hg, 1.75 grams (0.039 equivalents) of 1,4-butanediol, and 1.70 grams of one weight percent dibutyltin dilaurate catalyst 2000 MW polytetramethylene glcyol (0.002 OH equivalents). The isocyanate to hydroxyl ration was 1.03. The mixture was stirred thoroughly until homogeneous and then poured quickly into a 8"×8"×⅛" closed mold preheated at 80° C. The mold was transferred to a vented oven at 110° C. and cured at that temperature for 16 hours. The resultant polyurethane was cooled to room temperature and removed from the mold. The sample was conditioned at room temperature and 50% relative humidity for two weeks prior to testing. The sample retained its shape when stored at room temperature (23° C.).

Example 2C

Bis-(4-isocyanatocyclohexyl)methane containing 99 weight percent of the trans,trans isomer (310.68 grams, 2.368 equivalents) was charged as a crystalline solid to a 2-liter, 3-neck flask equipped with a thermocouple, condenser with drying tube, and a mechanical stirrer. After melting the solid diisocyanate at 85° C., 2000 MW polytetramethylene glycol (772.82 grams, 0.773 equivalents) was charged. The solution was mixed until homogeneous and then 16.50 grams of a one weight percent zo solution of dibutyltin dilaurate catalyst in 2000 MW polytetramethylene glycol (0.016 OH equivalents) was added. The reaction temperature was adjusted to 80° C. and held at that temperature for about two hours. At this point the reaction was complete, as the isocyanate content was 5.80% (theoretical % NCO=6.03). The prepolymer was then vacuum degassed for 30 minutes at 0.15 mm Hg.

To 115.00 grams (0.159 equivalents) of the above 5.80% NCO isocyanate-terminated prepolymer at 80° C. were added 110.50 grams (0.111 equivalents) of 2000 MW polytetramethylene glycol at 80° C. which was also degassed for 30 minutes at 0.15 mm Hg, 1.89 grams (0.042 equivalents) of 1,4-butanediol, and 1.71 grams of one weight percent dibutyltin dilaurate catalyst in 2000 MW polytetramethylene glycol (0.002 OH equivalents). The isocyanate to hydroxyl ratio was 1.03. The mixture was stirred thoroughly until homogeneous and then poured quickly into a 8"×8"×⅛" closed mold preheated at 80° C. The mold was transferred to a vented oven at 110° C. and cured at that temperature for 16 hours. The resultant polyurethane was cooled to room temperature and removed from the mold. The sample was conditioned at room temperature and 50% relative humidity for two weeks prior to testing. The sample retained its shape when stored at room temperature.

Example 3

A small metal can was charged with 11.73 grams (0.089 equivalents) of solid bis-(4-isocyanatocyclohexyl) methane containing 99 percent of the trans,-trans isomer and 50.00 grams (0.054 equivalents) of Elate NTR-101 at 90° C. This represents a 50:50 mole ratio of t-CHDI to t,t,-rMDI. The mixture was heated with a heat gun until the solid bis-(4-isocyanatocyclohexyl) methane melted. Then 138.78 grams (0.139 equivalents) of 2000 MW polytetramethylene glycol at 80° C. were added, followed by 0.75 grams of one weight percent stannous octoate in 2000 MW polytetramethylene glycol. The isocyanate to hydroxyl ration was 1.03. This solution was stirred thoroughly until homogeneous and then poured quickly into a 8"×8"×⅛" closed mold preheated at 100° C. The resultant polyurethane was cooled to room temperature and removed from the mold. The sample was conditioned for two weeks at room temperature and 50% relative humidity prior to testing. The sample retained its shape when stored at room temperature (23° C.).

Comparative Example 4 (CE 4)

Charged 10.32 grams (0.0787 equivalents) of bis-(4-isocyanato cyclohexyl) methane containing 20 weight percent of the trans,trans isomer and 87.5 grams of methyl isobutyl ketone to a small metal can. Stirred the solution until the solid diisocyanate dissolved. Then 77.17 grams (0.0772 equivalents) of Jeffamine D-2000 were charged while stirring. Jeffamine D-2000 is 2000 MW amine terminated polypropylene glycol. The isocyanate to amine ratio was 1.03. After the solution became homogeneous, two films were cast at a wet film thickness of 50 mils. The elastomer films were cured and conditioned for two weeks at room temperature and 50% relative humidity prior to testing.

Example 4

Charged 10.32 grams (0.0787 equivalents) of sold bis-(4-isocyanatocyclohexyl) methane containing 99 weight percent of the trans,trans isomer and 87.5 grams of methyl isobutyl ketone to a small metal can. Stirred this solution until the solid diisocyanate dissolved. Then 77.17 grams (0.0772 equivalents) of Jeffamine D-2000 were charged while stirring. The isocyanate to amine ratio was 1.03. After the solution became homogeneous, two films were cast at a wet film thickness of 50 mils. The elastomer films were cured and conditioned for two weeks at room temperature and 50% relative humidity prior to testing.

Example 5

Bis-(4-isocyanatocyclohexyl) methane containing 99 weight percent of the trans,trans isomer (143.12 grams, 1.091 equivalents) was charged as a crystalline solid to a 1-liter, 3-neck flask equipped with a thermocouple, condenser with a drying tube, and a mechanical stirrer. After melting the solid diisocyanate at 85° C., 2000 MW ethylene glycol 1,4-butanediol adipate polyester (359.31 grams, 0.356 equivalents) was charged. The solution was mixed until homogeneous and then 7.65 grams of a one weight percent solution of dibutyltin dilaurate catalyst in 2000 MW ethylene glycol 1,4-butanediol adipate polyester (0.008 OH equivalents) was added. The reaction temperature was adjusted to 80° C. and held at that temperature for about two hours. At this point the reaction was complete, as the isocyanate content was 5.79% (theoretical NCO=5.90). The prepolymer was then vacuum degassed for 30 minutes at 0.15 mm Hg.

To 160.00 grams (0.159 equivalents) of the above 5.79% NCO isocyanate-terminated prepolymer at 80° C. were added 154.82 grams (0.154 equivalents) of 2000 MW ethylene glycol 1,4-butanediol adipate polyester at 80° C. which was also degassed for 30 minutes at 0.15 mm Hg, and 2.73 grams (0.061 equivalents) of 1,4-butanediol. The isocyanate to hydroxyl ratio was 1.03. The mixture was stirred thoroughly until homogeneous and then poured quickly into a 8"×8"×1/8" closed mold preheated at 80° C. The mold was transferred to a vented oven at 110° C. and cured at that temperature for at least 16 hours. The resultant polyurethane was cooled to room temperature and removed from the mold. The sample was conditioned at room temperature and 50% relative humidity for two weeks prior to testing. The sample retained its shape when stored at room temperature (23° C.).

Example 6

Bis-(4-isocyanatocyclohexyl)methane containing 99 weight percent of the trans,trans isomer (70.61 grams, 0.538 equivalents) was charged as a crystalline solid to a 1-liter, 3-neck flask equipped with a thermocouple and a mechanical stirrer. After melting the solid diisocyanate at 90° C., 2000 MW 1,6-hexanediol polycarbonate (421.29 grams, 0.421 equivalents) at 80° C. and 1,4-butanediol (4.39 grams, 0.0975 equivalents) at room temperature were charged. The solution was mixed until homogeneous and the temperature was adjusted to 70° C. After degassing the solution for 15 minutes at 0.15 mm Hg, 3.75 grams of a one weight percent solution of dibutyltin dilaurate catalyst in 2000 MW 1,6-hexanediol polycarbonate (0.004 OH equivalents) was charged. The isocyanate to hydroxyl ration was 1.03. The solution was mixed thoroughly, vacuum degassed at 0.15 mm Hg for one minute, and then poured quickly into a 8"×8"×⅛" closed mold preheated at 80° C. The mold transferred to a vented oven at 110° C. and cured at that temperature for at least 16 hours. The resultant polyurethane was cooled to room temperature and removed from the mold. The sample was conditioned at room temperature and 50% relative humidity for two weeks prior to testing. The sample retained its shape when stored at room temperature (23° C.).

TABLE 1

Summary of the Elastomer Properties for Example 1-6

| | EXAMPLE | | | | | | | | | | |
|---|---|---|---|---|---|---|---|---|---|---|---|
| | CE1 | 1 | CE2 | 2A | 2B | 2C | 3 | CE4 | 4 | 5 | 6 |
| t,t-PICM | 20 | 99 | 20 | 50 | 80 | 99 | PICM/t-CHDI (50/50 mole ratio) | 20 | 99 | 99 | 99 |
| Chain extender/polyol or polyamine mole ratio | $0.0^a$ | 0.0 | $0.21^{a,b}$ | 0.21 | 0.21 | 0.21 | $0.0^a$ | $0.0^c$ | $0.0^c$ | $0.21^{b,d}$ | $0.23^{b,a}$ |
| Retained shape at room temperature (23° C.) | No | Yes | No | Yes | Yes | Yes | Yes | No | Yes | Yes | Yes |
| Hardness (Shore A) | 10 | 58 | 30 | 42 | 63 | 67 | 22 | $-f$ | 71 | 66 | 78 |
| Hardness (Shore D) | 3 | 15 | 7 | 10 | 18 | 22 | 4 | $-f$ | 15 | 18 | 28 |
| Elongation (%) | >1000 | 940 | >1000 | 950 | 790 | 820 | >1000 | >1000 | >1000 | 960 | 460 |
| Tensile Strength (PSI) | $-g$ | 3020 | $-g$ | 1490 | 2970 | 4180 | 420 | $-g$ | 1035 | 1000 | 4780 |
| Modulus @ | | | | | | | | | | | |
| 100% (PSI) | 40 | 140 | 80 | 125 | 185 | 295 | 75 | 30 | 565 | 255 | 385 |
| 300% | 25 | 215 | 55 | 125 | 245 | 375 | 75 | 30 | 575 | 320 | 1020 |
| 500% | 25 | 275 | 50 | 125 | 450 | 635 | 80 | 30 | 730 | 445 | — |
| 700% | 25 | 860 | 50 | 311 | 1570 | 2570 | 100 | 30 | 840 | 570 | — |
| 900% | 25 | — | 50 | 974 | — | — | 225 | 30 | 905 | 830 | — |
| Split Tear | $-h$ | 93 | 8 | 35 | 85 | 113 | $n.d.^i$ | n.d. | n.d. | n.d. | n.d. |

TABLE 1-continued

| Summary of the Elastomer Properties for Example 1-6 | | | | | | | | | | |
|---|---|---|---|---|---|---|---|---|---|---|
| EXAMPLE | | | | | | | | | | |
| CE1 | 1 | CE2 | 2A | 2B | 2C | 3 | CE4 | 4 | 5 | 6 |

Strength (PLI)

<sup>a</sup>The polyol is 2000 MW polytetramethylene glycol.
<sup>b</sup>The chain extender is 1,4-butanediol.
<sup>c</sup>the polyamine is Jeffamine D-2000, available from Texaco Chemical Co.
<sup>d</sup>The polyol is 2000 MW ethylene glycol 1,4-butanediol adipate polyester.
<sup>e</sup>The polyol is 2000 MW 1,6-hexanediol polycarbonate.
<sup>f</sup>The sample was too soft and sticky to measure the hardness.
<sup>g</sup>The tensile strength could not be determined because the sample was stringy and did not break.
<sup>h</sup>The split tear strength could not be determined because the sample flowed out.
<sup>i</sup>n.d. = not determined Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An improved elastomer comprising a reaction product of a polyisocyanate and an active hydrogen containing material, the improvement wherein the elastomer is essentially free of a chain extender, and the polyisocyanate comprises 4,4'-diisocyanato dicyclohexylmethane containing from 45 to 100 percent by weight of the trans,trans isomer.

2. The improved elastomer of claim 1 wherein the 4,4'-diisocyanato dicyclohexylmethane contains from about 70 to 100 percent by weight of the trans,trans isomer.

3. In an improved process for preparing an elastomer comprising reacting a polyisocyanate with an active hydrogen containing material, the improvement wherein the active hydrogen is essentially free of a chain extender and wherein the polyisocyanate comprises 4,4'-diisocyanato dicyclohexylmethane containing the trans,trans isomer in an amount of about 45 to 100 percent by weight.

4. The improved process of claim 3 wherein the 4,4'-diisocyanato dicyclohexylmethane contains from about 70 to 100 percent by weight of the trans,trans isomer.

5. A poly(urethane-urea) consisting essentially of:
(A) 1.0 mole of an active hydrogen containing material with terminal primary and/or secondary hydroxyl groups having a molecular weight of about 600–5000 and a functionality of 2 to 6,
(B) a polyisocyanate containing from 45 to 100 weight percent of the trans,trans-4,4'-diisocyanato dicyclohexylmethane isomer, in an amount which is substantially equivalent to the mole of (A); and
(C) Optionally, a urethane forming catalyst.

* * * * *